(12) United States Patent
Gronowicz, Jr. et al.

(10) Patent No.: US 11,217,978 B2
(45) Date of Patent: Jan. 4, 2022

(54) ANTI-SLIP SYSTEM WITH OVERMOLD OPERATION

(71) Applicant: Yazaki North America, Inc., Canton, MI (US)

(72) Inventors: William Gronowicz, Jr., Westland, MI (US); Jeffrey Edward Malotke, II, Westland, MI (US); Richard Joseph Exenberger, Plymouth, MI (US)

(73) Assignee: Yazaki North America, Inc., Canton, MI (US)

( * ) Notice: Subject to any disclaimer, the term of this patent is extended or adjusted under 35 U.S.C. 154(b) by 54 days.

(21) Appl. No.: 16/369,815

(22) Filed: Mar. 29, 2019

(65) Prior Publication Data
US 2020/0313415 A1    Oct. 1, 2020

(51) Int. Cl.
*H02G 3/22* (2006.01)
*H02G 1/00* (2006.01)
*B60R 16/02* (2006.01)

(52) U.S. Cl.
CPC ............... *H02G 3/22* (2013.01); *H02G 1/00* (2013.01); *B60R 16/0222* (2013.01)

(58) Field of Classification Search
CPC ......... H02G 3/22; H02G 1/00; B60R 16/0222
See application file for complete search history.

(56) References Cited

U.S. PATENT DOCUMENTS

| 3,924,883 A * | 12/1975 | Frank ................. F16L 33/2075 285/256 |
| 6,438,828 B1 | 8/2002 | Uchiyama |
| 2018/0265018 A1* | 9/2018 | Yabashi ................ F16L 5/10 |

* cited by examiner

*Primary Examiner* — David P Bryant
*Assistant Examiner* — Nirvana Deonauth
(74) *Attorney, Agent, or Firm* — Foley & Lardner LLP

(57) ABSTRACT

A grommet includes a body portion defining a first aperture and a second aperture. A hollow channel extends between the first aperture and the second aperture. The channel is defined by an interior surface of the body portion. One or more engagement structures are defined by the interior surface of the grommet body portion, and are configured to engage one or more corresponding engagement structures provided about an exterior surface of a mounting structure engaged about and elongated member that is positioned within the hollow channel of the grommet.

14 Claims, 5 Drawing Sheets

ANTI-SLIP SYSTEM WITH OVERMOLD OPERATION

BACKGROUND

Grommet systems may be used to transmit an elongated member through a passageway extending through and defined by a structure that separates two different environments. In such grommet systems, it may be desirable to minimize, limit, or prevent movement of the grommet relative to the elongated member that is to be transmitted through the grommet passageway. Additionally, it may be desirable to minimize or prevent the passage of contaminants between the two environments separated by the structure.

Existing grommet systems for limiting movement of a grommet relative to a member (e.g., a wire harness) pose a number disadvantages, including: not incorporating a location alignment device that works in conjunction with the placement of the grommet on a member; slipping of the grommet relative to a member (causing inaccurate placement of the grommet relative to a member); not providing a barrier to fluids/contaminants; etc. Such limitations of existing grommet systems often result in the failure of the grommet system to meet customer slip and contamination requirements.

Given the limitations of existing grommet systems, it would be desirable to provide a system configured to minimize, limit, or prevent movement of a grommet relative to a member about which the grommet is installed.

SUMMARY

According to one implementation of the present disclosure, a grommet includes a body portion defining a first aperture and a second aperture. A hollow channel extends between the first aperture and the second aperture. The channel is defined by an interior surface of the body portion. A first groove is defined by the interior surface of the hollow channel at a first location located between the first aperture and the second aperture. A second groove is defined by the interior surface of the hollow channel at a second location located between the first aperture and the second aperture. The first groove and the second groove are configured to engage an exterior surface of an elongated member inserted into the hollow channel.

In some embodiments, the grommet includes an engagement structure extending outwardly and annularly about an exterior surface of the body portion. In some embodiments, a location along the body portion at which the engagement structure extends corresponds to the location along the body portion at which the first groove is defined.

In some embodiments, an outwardly and annularly extending rib is provided about an exterior surface of the body portion adjacent the second aperture. In some embodiments, a thickness of the body portion as defined between the exterior surface of the body portion and the interior surface is substantially uniform along a portion of the body portion defined between a location adjacent a rear end of the annularly extending rib and a location adjacent a front end of an outwardly and annularly extending engagement structure provided about an exterior surface of the body portion adjacent the first aperture. In some embodiments, a diameter of the hollow channel is tapered between the first aperture and the second aperture.

According to one implementation of the present disclosure, a grommet assembly kit includes a mounting structure and a grommet. The mounting structure is configured to extend about an exterior surface of an elongated member. The mounting structure includes an engagement rib provided about an exterior surface of the mounting structure. The grommet includes a body portion defining a first aperture and a second aperture. A hollow channel extends between the first aperture and the second aperture. The channel is defined by an interior surface of the body portion. An engagement structure is provided along the interior surface of the hollow channel at a second location located between the first aperture and the second aperture. The engagement structure of the grommet is configured to engage the engagement rib of the mounting structure when the elongated member about which the mounting structure extends is inserted into the hollow channel to prevent movement of the grommet in an axial direction relative to the elongated member.

In some embodiments, a diameter of the engagement structure is smaller than a diameter of the engagement rib of the mounting structure. In some embodiments, the grommet includes an outwardly and annularly extending rib provided about an exterior surface of the body portion adjacent the first aperture. In some embodiments, the mounting includes a second engagement rib provided about the exterior surface of the mounting structure. A front surface of the annularly extending rib provided about the exterior surface of the body portion is configured to engage a rear surface of the second engagement rib of the mounting structure when the elongated member about which the mounting structure extends is inserted into the hollow channel. In some embodiments, the first engagement structure comprises a groove defined by the interior surface of the body portion into which the engagement rib is configured to be inserted.

In some embodiments, the mounting structure includes a body portion defining a hollow passageway through which the elongated member is configured to be inserted. In some embodiments, the mounting structure is defined by a material that has been molded about an exterior of the elongated member. In some embodiments, at least a portion of the material from which the mounting structure is molded extends into at least a portion of one or more interstices defined between adjacent filaments that define the elongated member about which the mounting structure is molded.

According to one implementation of the present disclosure, a method includes providing an elongated member having an exterior surface about which a mounting structure is provided, providing a grommet, and mounting the grommet about the mounting structure provided about the elongated member. An exterior surface of the mounting structure includes a first outwardly extending projection provided at a first location about the mounting structure and a second outwardly extending projection provided at a second location about the mounting structure. The first location is spaced apart from the second location by a first distance. The grommet includes a body portion defining a first aperture and a second aperture. A hollow channel extends between the first aperture and the second aperture. The channel is defined by an interior surface of the body portion. A first engagement structure is provided along the interior surface of the hollow channel at a third location located between the first aperture and the second aperture. A second engagement structure is provided along the interior surface of the hollow channel at a fourth location located between the first aperture and the second aperture. The fourth location is spaced apart from the third location by a second distance substantially equal to the first distance.

In some embodiments, a configuration of an inner periphery defined by a first portion of the inner surface of the grommet body portion extending between the third location and the fourth location substantially mirrors a configuration of an outer periphery defined by a first portion of the mounting structure exterior surface that extends between the first location and the second location. In some embodiments, the inner periphery defined by the first portion of the inner surface of the grommet body defines a diameter that is smaller than a diameter defined by the first portion of the exterior surface of the mounting structure.

In some embodiments, mounting the grommet about the elongated member includes aligning the first portion of the inner surface of the grommet body about the first portion of the exterior surface of the mounting structure. In some embodiments, mounting the grommet about the elongated member includes expanding the hollow channel defined by the grommet body portion such that the diameter defined by the first portion of the inner surface of the grommet body is larger than the diameter defined by the first portion of the exterior surface of the mounting structure. The elongated member is inserted through the expanded hollow channel. The first portion of the inner surface of the grommet body forms a compression fit about the first portion of the exterior surface of the mounting structure once the grommet has been mounted about the mounting structure.

In some embodiments, the grommet is mounted about the elongated member such that movement of the grommet relative to the elongated member is substantially prevented by the engagement of the first engagement structure with the first projection of the mounting structure and the engagement of the second engagement structure with the second projection of the mounting structure.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, an anti-slip assembly generally includes a grommet and a wire harness. Provided along the wire harness is a mounting structure defined by a surface that extends around a portion of or the entirety of the exterior of the wire harness. A hollow channel defined by the grommet, through which the mounting apparatus (and wire harness) is configured to pass, includes features configured to securely mount the grommet to one or more features defined by the mounting structure so as to minimize, limit, or prevent movement of the grommet relative to the mounting structure, as well as to minimize, limit, or prevent contaminants (including any combination of solid, liquid, and/or gas contaminants) from passing through the anti-slip assembly.

The methods described herein provide improved solutions for assembling an anti-slip system. In particular, the arrangement of the grommet, mounting structure, and wire harness as disclosed herein is configured to allow for a quick and easy securement of the grommet at a particular location on the mounting structure.

Figure 1:
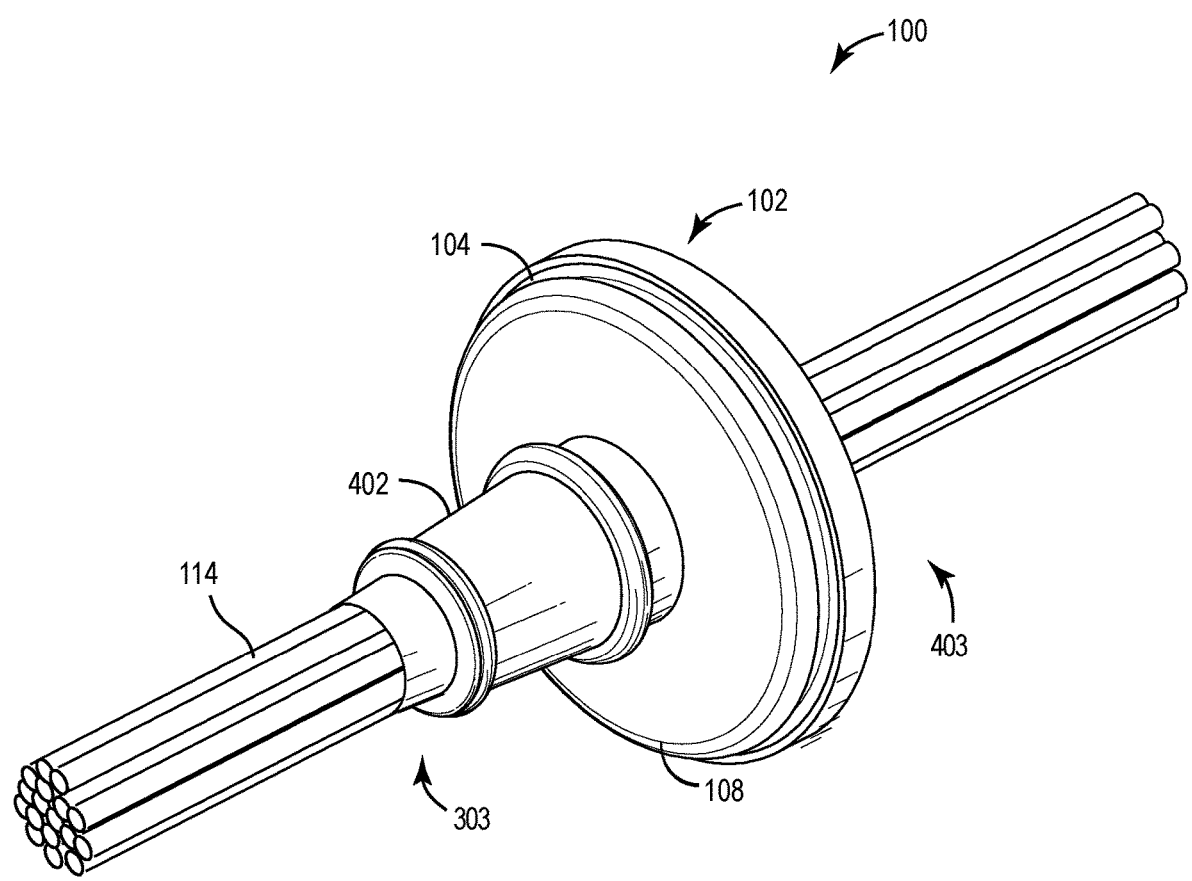
FIG. 1 is a perspective view of an anti-slip assembly, according to an exemplary embodiment.

Referring now to FIG. 1, an anti-slip system 100 including a grommet 102 and a wire harness 114 according to an exemplary embodiment is shown. In general, grommet 102 defines a hollow channel 116 extending between a first end 303 and a second end 403. As will be described in more detail below, the hollow channel 116 includes one or more features configured to secure the grommet 102 relative to a wire harness 114 extending through the hollow channel 116.

Figure 2A:
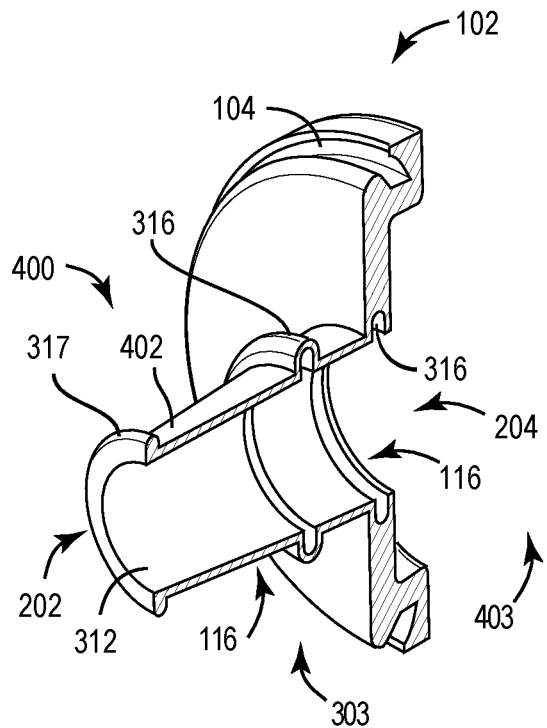
FIG. 2A is a perspective, cross-sectional view of a grommet, according to an exemplary embodiment.
Figure 2B:
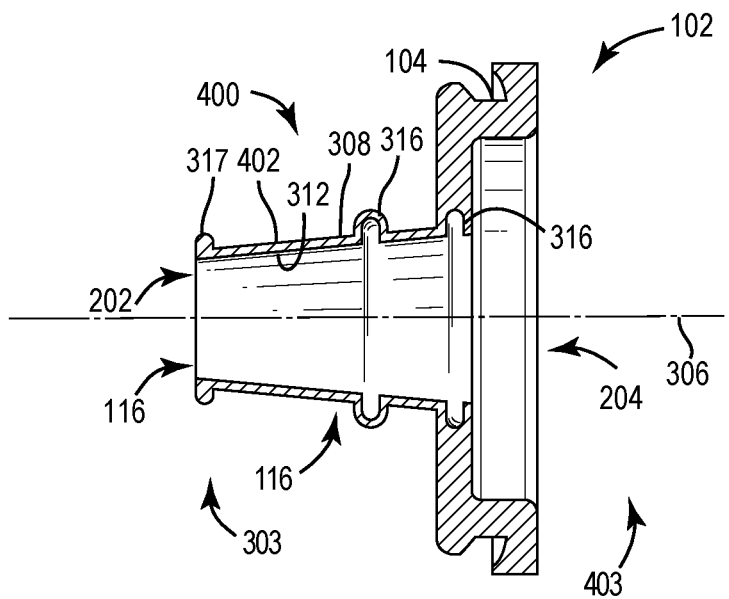
FIG. 2B is a side, cross-sectional view of the grommet of FIG. 2A, according to an exemplary embodiment.

Referring to FIGS. 2A and 2B, a grommet 102 is shown according to an exemplary embodiment. In general, grommet 102 is defined by a body portion 400 having an exterior surface 402 and an interior surface 312 that defines a hollow channel 116.

The exterior surface 402 of the grommet 102 may be defined according to any number of, and combination of, differing shapes, sizes, features, dimensions, configurations, and other characteristics. Provided and/or formed along the exterior surface 402 of grommet 102 may be one or more engagement structures or elements via which grommet 102 may be mounted, attached, installed, or otherwise engaged to an external structure (not shown). As will be understood, according to various embodiments, the grommet 102 may be engaged within a passageway extending from a first surface of an external structure to a second surface of the external structure. In some embodiments, the seal between the grommet 102 and the passageway defined by the external structure may advantageously be a substantially fluid-tight seal configured to limit, minimize, or prevent the transmission of contaminants (e.g., oil, dust, water, etc.) between a first environment to which the first surface of the external structure is exposed and a second environment to which the second surface of the external structure is exposed.

The one or more engagement structures and/or elements provided and/or formed about the exterior surface 402 of the grommet 102 may be defined according to any number of, and combination of, known arrangements. For example, in some embodiments, the engagement structure may be defined by a recess or groove 104 extending about a portion of, or the entirety of, the outer circumference of the exterior surface 402 of grommet 102. As shown in FIG. 1, according to various embodiments, the groove 104 may be provided about a support structure 108 extending radially outwards from and about a portion or the entirety of the grommet 102 exterior surface 402. The groove 104 may be formed having a similar shape (e.g., circular, rectangular, etc.) and size as the passageway in the external structure, such that the engagement structure may be press-fit into the external structure passageway. In other embodiments, the engagement structure may include any other number of different features, arrangements, or combinations (e.g., hook and loop, adhesive material, snap fit, etc.) via which the grommet 102/anti-slip system 100 may be attached, mounted, or otherwise installed relative to an exterior structure.

Referring to FIGS. 2A and 2B, the interior surface 312 of grommet 102 defines a hollow channel 116 extending between a first aperture 202 defined by a first end 303 of the grommet 102 and a second aperture 204 defined by a second end 403 of the grommet 102. Hollow channel 116 is shown to include internal grooves 316 and an external bumper 317 according to an exemplary embodiment, the functions of which will each be described in greater detail below. As will be explained in greater detail below, in various embodiments, interior surface 312 may provide features (e.g., texturing, scoring, adhesive, etc.) to further minimize, restrict, limit, or prevent movement of grommet 102 relative to an elongated member transmitted through hollow channel 116.

In the embodiment of FIGS. 2A and 2B, first aperture 202 and second aperture 204 are shown to include circular cross-sections. In other embodiments, first aperture 202 and/or second aperture 204 may be defined by any other cross-sectional shapes (e.g., square, triangular, etc.). The cross-sectional shape and/or dimensions of the first aperture 202 may be the same or may be different than the cross-sectional shape and/or dimensions of the second aperture 204. In some embodiments, the cross-sectional shape of hollow channel 116 may be similar or the same as the cross-sectional shape of the first aperture 202 and/or second aperture 204. In other embodiments, hollow channel 116 may define a different cross-sectional shape (e.g., rectangular, triangular, etc.) than the cross-sectional shape of the first aperture 202 and/or second aperture 204. Additionally, first aperture 202 and second aperture 204 may be formed having dimensions that are generally the same, or which differ, from one another.

The hollow channel 116 is defined between the first aperture 202 and the second aperture 204. In some embodiments, the hollow channel 116 may be centered about an axis 306 about which each of the first aperture 202 and second aperture 204 are centered, such that the first aperture 202, hollow channel 116, and second aperture 204 are generally aligned between the first end 303 to the second end 403 of the grommet. In other embodiments, any or all of the first aperture 202, second aperture 204, and/or the hollow channel 116 may be centered about and extend along different axes.

According to some embodiments, the interior surface 312 of grommet 102 may be defined by one or more radially outwards extending internal grooves 316. Accordingly, as illustrated by FIG. 2B, a diameter of the hollow channel 116 as measured radially outward from an axis about which the hollow channel 116 extends (such as, e.g., axis 306) and the interior surface 312 of the grommet 102 may vary between first end 303 and second end 403 of the grommet 102. As will be described in more detail below, those portions of the interior surface 312 defining the internal grooves 316 are configured to receive corresponding ribs 334 provided about and extending outwardly from the exterior surface 302 of a mounting structure 300 provided about a wire harness 114, so as to provide a barrier against movement of the grommet 102 relative to the wire harness 114.

As will be understood, the diameter of the hollow channel 116 along the length of the grommet 102 may vary depending on the number, sizing, spacing, configuration, and arrangement of the internal grooves 316 provided along/defined by the interior surface 312, as well as the overall thickness, dimensions, and configuration of the wall defining the body portion 400 of the grommet 102 that is defined between the interior surface 312 and exterior surface 402 of the grommet 102. In some embodiments, the changes in diameter along the length of the hollow channel 116 as defined between the first end 303 and the second end 403 may follow a uniform or semi-uniform pattern of varying diameters, while in other embodiments, the changes in diameter along the length of the hollow channel 116 may be non-uniform.

Referring to FIGS. 2A and 2B, according to some embodiments, grommet 102 may include two internal grooves 316 extending radially outward from the hollow channel 116 according to an exemplary embodiment. In some embodiments, grommet 102 may include any other number of one or more internal grooves 316 provided along the interior surface 312 of the grommet 102. As will be described in more detail below, according to various embodiments, the number, shape, size, spacing and/or arrangement of the internal grooves 316 may be configured to match (or substantially match) the number, shape, size, spacing and/or arrangement of the external ribs 334 of the mounting structure 300 provided about the wire harness 114.

According to various embodiments, internal grooves 316 may extend continuously around an entirety or portion of the circumference of interior surface 312. As illustrated in FIG. 2B, according to some embodiments, internal grooves 316 are shown to define an outermost diameter measured radially outward from axis 306 that is larger than a diameter measured radially outward from the axis 306 to the interior surface 312 of the grommet 102 at a location where an internal groove 316 is not provided. In some embodiments, some or all of the internal grooves 316 may each define different or similar diameters forming, thereby forming a tapered structure of changing diameter defined by the interior surface 312 of the grommet 102. In other embodiments, internal grooves 316 may include any combination of diameters (e.g., one internal groove of the same diameter and one internal groove of a different diameter).

In some embodiments, at least one internal groove 316 may be located adjacent the first aperture 202 and/or at least one internal groove 316 may be located adjacent second aperture 204. According to some embodiments, an internal groove 316 may be provided at a location along the length of the grommet 102 corresponding to a location about which the engagement structure (e.g. support structure 108) is formed. In some embodiments (not shown), such as, e.g., in embodiments in which the interior surface 312 tapers between the first end 303 and the second end 403 of the grommet, the internal grooves 316 may define an innermost diameter radially outwards from axis 306 that is smaller than a diameter measured radially outward from the axis 306 to the interior surface of the grommet 102 at a location where an internal groove 316 is not provided.

As illustrated in FIGS. 2A and 2B, according to various embodiments, internal grooves 316 may be defined by rounded structures that extend annularly about the entirety or portion of the interior surface 312 defining the hollow channel 116. According to other embodiments, some or all of the internal grooves 316 may be defined having any other shapes, sizes, configurations, or arrangements. In some embodiments (not shown), grommet 102 may not include internal grooves 316 and may instead include one or more other structures that extend into the interior surface 312 and/or extend outwards from the interior surface 312 configured to engage corresponding structures that protrude inwards and/or outwards from an exterior surface 322 of the mounting structure 300 so as to prevent or limit movement of the grommet 102 relative to the wire harness 114. For example, according to some embodiments (not shown), one or more ribs extending inwardly from the interior surface 312 defining the hollow channel 116 may be configured to engage with corresponding grooves formed about an exterior surface 322 of the mounting structure 300. In yet other embodiments (not shown) one or more ribs extending inwardly from the interior surface 312 defining the hollow channel 116 may be configured to engage with one or more ribs extending outwardly from the exterior surface 322 of the mounting structure 300.

Although internal grooves 316 are shown as defined by rounded structures that extend annularly about the entirety of the interior surface 312, according to some embodiments (not shown), one or more internal grooves may alternatively, or additionally, be defined having an axially extending arrangement. As will be understood, in such embodiments, the mounting structure may be provided with one or more axially extending external ribs configured to engage the axially extending internal grooves of the grommet so as to prevent or minimize a rotational displacement of the grommet 102 relative to the wire harness during use of the anti-slip system 100, thereby providing rotational securement of the mounting of the grommet 102 relative to the wire harness 114 in addition to the axial securement of the grommet 102 relative to the wire harness 114 provided by the engagement of any optionally provided circumferentially extending internal grooves 316 on the grommet 102 with any optionally provided ribs 334 provided on the mounting structure 300. According to some embodiments, in addition to, or as an alternative to, internal grooves 316 and/or other structure provided along the interior surface 312 configured to engage one or more structures provided on the exterior surface 322 of the mounting structure 300, the grommet 102 may include features such as, e.g., texturing, scoring, etc. along the interior surface 312 of the grommet 102 configured to engage with the exterior surface of 322 of the mounting structure 300 to prevent or limit movement of the grommet 102 relative to the wire harness 114.

According to various embodiments, grommet 102 may optionally include a radially outwardly extending external bumper 317 defined by and/or provided on the exterior surface 402 of the grommet 102 at the first end 303 and/or the second end 403 of the grommet 102. Referring to FIGS. 2A and 2B, in some embodiments, external bumper 317 may be formed having an annular shape the extends about the entirety or a portion of the circumference defined by exterior surface 402. In other embodiments, the external bumper(s) 317 may be defined having different diameters and/or different shapes, sizes, configurations, and/or arrangements.

Figure 4A:
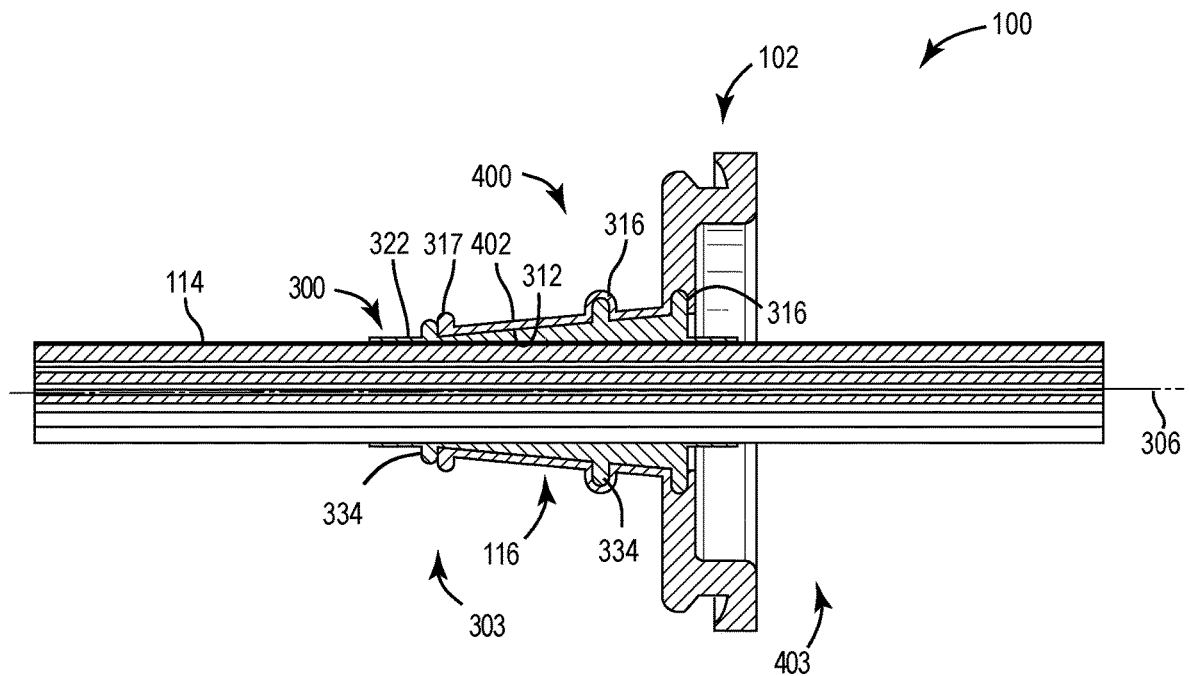
FIG. 4A is a side, cross-sectional view of an anti-slip assembly, according to an exemplary embodiment.
Figure 4B:
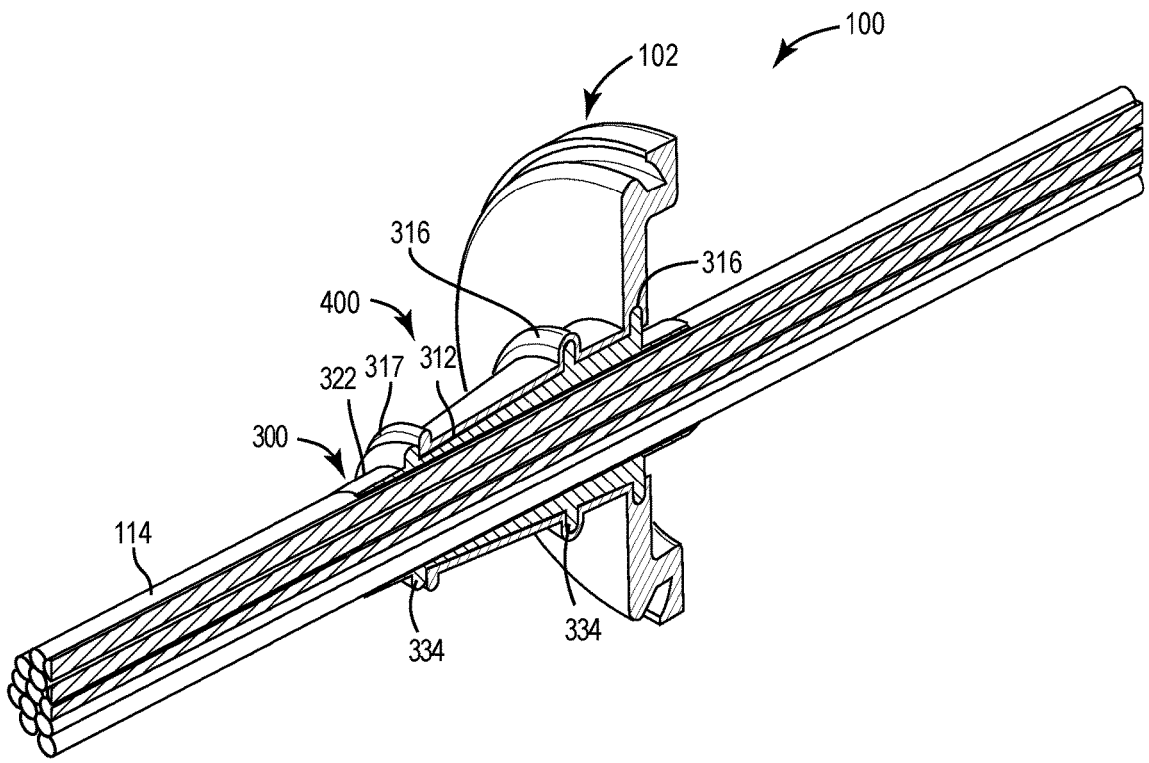
FIG. 4B is a perspective, cross-sectional view of the anti-slip assembly of FIG. 4A according to an exemplary embodiment.

In some embodiments, the thickness of a wall of the body portion 400 of the grommet 102 defined between the exterior surface 402 and the interior surface 312 at which an external bumper 317 is provided may vary from the thickness of a wall of the body portion 400 at which an external bumper 317 is not provided. The increased thickness of the wall of the body portion 400 of the grommet 102 at the first end 303 as defined by the optionally provided external bumper 317 is configured to provide an increased surface area via which the grommet 102 may engage or otherwise abut an optionally provided external rib 334 defined by the mounting structure 300, and to thus provide additional prevention of (or resistance against) the movement of the grommet 102 relative to the wire harness 114. Additionally, as illustrated by FIGS. 4A and 4B, the engagement of the external bumper 317 with a rib 334 of the mounting structure 300 may provide a visual indication to a user that the grommet 102 has been properly aligned relative to the mounting structure 300, thus facilitating the engagement of the remaining ribs 334 of the mounting structure 300 with corresponding internal grooves 312 of the grommet 102.

Figure 3A:
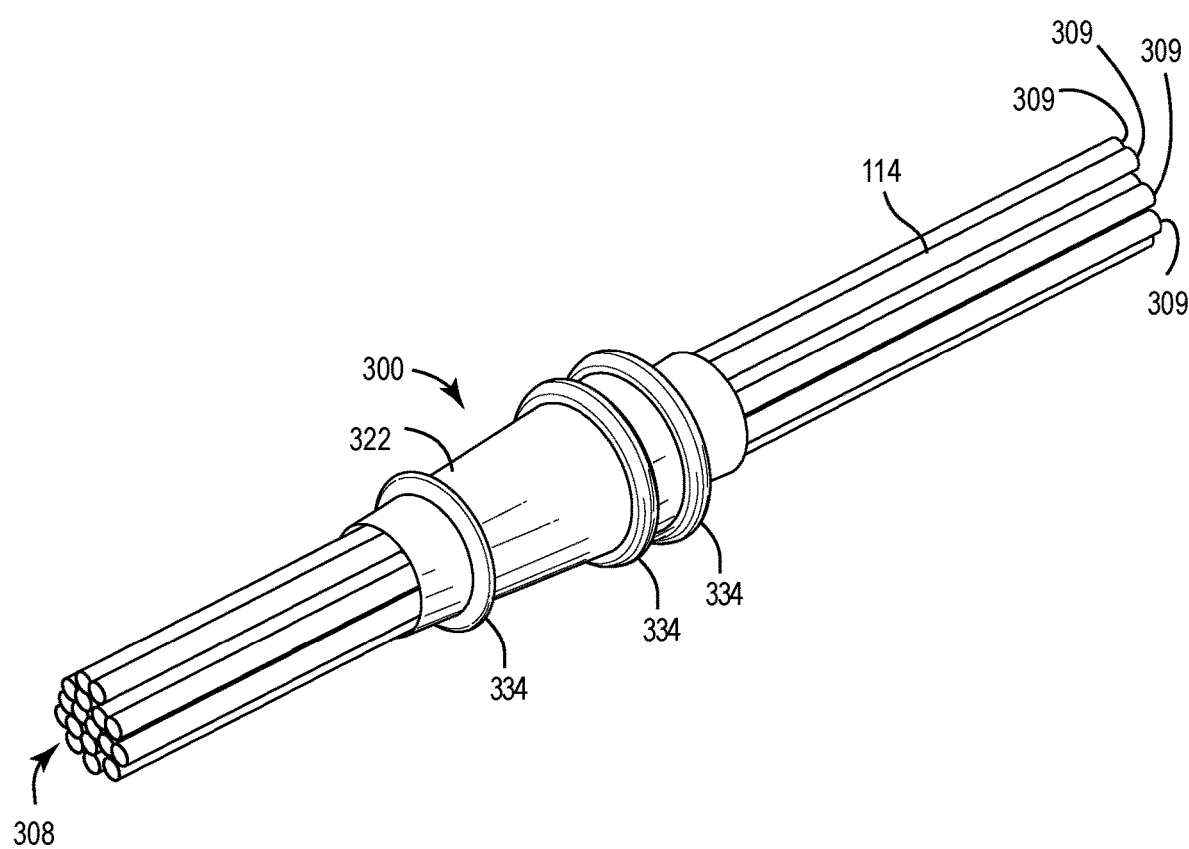
FIG. 3A is a perspective view of a mounting structure provided along a wire harness, according to an exemplary embodiment.

Referring now to FIG. 3A, a perspective view of a wire harness 114 is shown according to an exemplary embodiment. As will be understood, according to various embodiments, the configurations and/or features of the wire harness 114 may be adapted based on the desired use of the wire harness 114 and/or anti-slip system 100. The wire harness 114 about which the grommet 102 is mounted may be provided having any desired dimensions, and may be formed of any number of, or combination of, different materials.

As shown in FIG. 3A, according to various embodiments, wire harness 114 may be defined by a wire bundle 308 comprising a plurality of wires 309. In some embodiments, additional or fewer wires 309 may be included in the wire bundle 308 from that illustrated by the embodiment of FIG. 3A. In other embodiments, wire harness 114 may be defined by a single wire 309. As illustrated by the wire harness 114 embodiment of FIG. 3A, in some embodiments of a wire bundle 308 defined by a plurality of wires 309, the wires 309 may extend co-linearly along the length of the wire harness 114. Alternatively, the wire harness 114 may be defined by any number of different arrangements (e.g., in which some or all of the wires 309 of the wire bundle 308 are intertwined). In some embodiments, some or all of the wires 309 defining the wire harness 114 may be partially or entirely insulated, coated, or otherwise covered along a portion or an entirety of the length of wire(s) 309. Additionally, or alternatively, a portion or an entirety of a wire bundle 308 defined by one or more wires 309 may be insulated or coated along a portion or an entirety of the length of the wire bundle 308.

In some embodiments, the wires 309 defining wire harness 114 may be capable of conducting electricity and/or transmitting communication data. In other embodiments, the wires 309 of wire harness 114 may instead be any number of, and combination of one or more solid or hollow and metallic or non-metallic tubes or other elongated members configured to be used to perform and/or provide any number of additional, or alternative, functions such as, e.g., provide structural reinforcement, fluid transportation, etc.

Figure 3B:
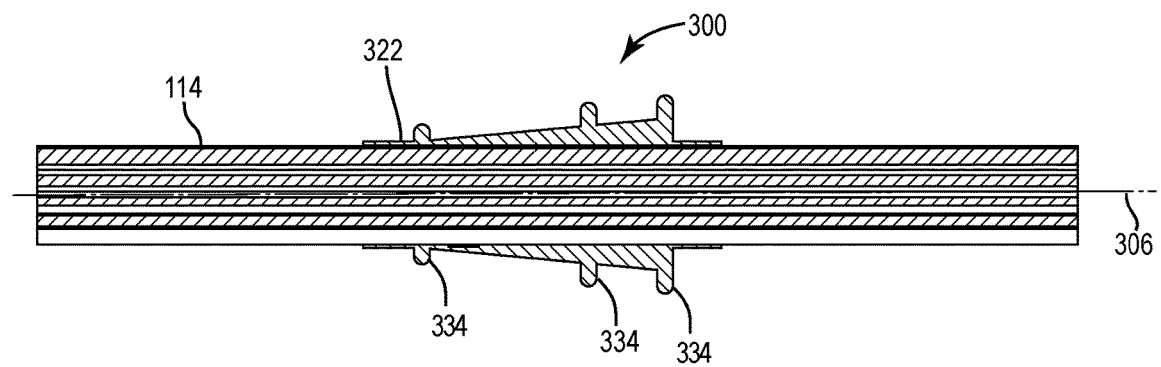
FIG. 3B is a side, cross-sectional view of a mounting structure provided along a wire harness, according to an exemplary embodiment.
Figure 3C:
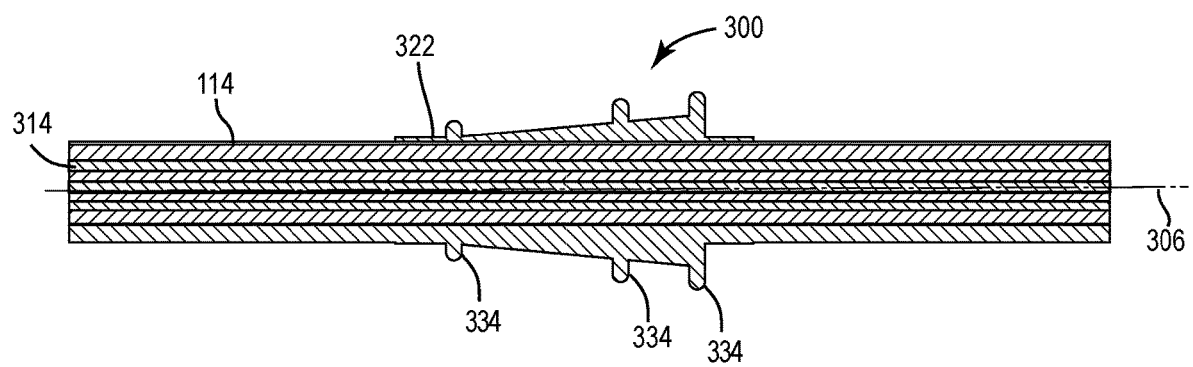
FIG. 3C is a side, cross-sectional view of a mounting structure provided along a wire harness, according to an exemplary embodiment.

Referring now to FIGS. 3A-3C, a mounting structure 300 attached to, provided about, defined by, extending along, or otherwise formed about the wire harness 114 is shown according to an exemplary embodiment. The mounting structure 300 may be defined according to any number of, and combination of, desired dimensions, shapes, sizes, features, configurations, and other characteristics, and may be formed of any number of, or combination of, different materials. As will be described in more detail below, an exterior surface 322 of the mounting structure 300 may include one or more features configured to engage the internally extending grooves 316 (or other structures defined by the interior surface 312 of the grommet 102) to prevent, restrict or minimize movement of the grommet 102 relative to the wire harness 114. In some embodiments, the exterior surface 322 of the mounting structure 300 may optionally also be provided with additional features (e.g., texturing, scoring, adhesive, etc.) configured to further limit, prevent, restrict, or minimize movement of grommet 102 relative to mounting structure 300.

The mounting structure 300 may be formed about wire harness 114 according to any number of different configurations and arrangements configured to limit, prevent, restrict, or minimize movement of wire harness 114 relative to mounting structure 300. As will be understood, the mounting structure 300 may be formed/provided about wire harness 114 according to any other number of attachment, bonding, molding, or other methods. For example, in some embodiments, such as, e.g., illustrated by the mounting structure 300 embodiment illustrated in FIG. 3B, the mounting structure 300 may be provided as a separate, discrete element that is secured about the exterior of the wire harness 114 using any number of different arrangements, such as, e.g., an adhesive connection, a compression fit of the mounting structure 300 about the wire harness 114 (in which a channel extending through the mounting structure 300 defines a diameter that is less than a diameter defined by an exterior of the wire harness), welding, bonding, etc.

In some embodiments, the mounting structure 300 may additionally be formed about the exterior of the of wire harness 114 in a manner that is configured to provide a fluid-tight (or substantially fluid-tight) seal that prevents or minimizes transmission of contaminants from a first portion of the wire harness 114 extending axially in front of the mounting structure 300 to a second portion of the wire harness 114 extending axially rearwards of the mounting structure 300 via any voids or interstices formed or defined between the wires of wire harness 114. Accordingly, as illustrated by FIG. 3C, in some embodiments, the mounting structure 300 may be formed about the wire harness 114 such that the material defining the mounting structure 300 may substantially and uniformly be impregnated through all (or substantially all) voids and interstices defined between the wires of wire harness 114. In some such embodiments, the mounting structure 300 may be molded about the wire harness 114 so as to form a monolithic structure that both extends about an exterior of the wire harness 114 and extends through the wire harness 114. In some such embodiments, the mounting structure 300 may be molded such that the material defining the mounting structure 300 extends through and impregnates substantially all of the voids between the wires of the wire harness 114 along the portion of the wire harness 114 about which the mounting structure 300 is formed. Alternatively, the mounting structure 300 may be molded such that the material defining the mounting structure does not impregnate all (or any) of the voids between the wires of the wire harness 114, and instead only flows about and hardens about an exterior surface of the wire harness 114.

Alternatively, in some embodiments, the mounting structure 300 may instead be provided as a discrete element that is secured about the wire harness 114 via the adhesion and/or bonding of a filler material that is used to impregnate the voids between the wire of the wire harness 114 and any gaps defined between the exterior of the wire harness 114 and an interior surface of a channel extending through the mounting structure 300. In yet other embodiments, the voids between the wires of the wire harness 114 may be impregnated using a material that is distinct from any materials that may be used to secure a separately and discretely provided mounting structure 300 about the wire harness 114.

Provided and/or formed along the exterior surface 322 of mounting structure 300 may be one or more external ribs 334 via which mounting structure 300 is configured to engage with one or more internal grooves 316 and/or external bumpers 317 of grommet 102. Referring to FIGS. 3A-3C, mounting structure 300 is shown to include three external ribs 334 according to an exemplary embodiment. According to other embodiments, mounting apparatus may include any other number of one or more external ribs provided along the exterior surface 322 of the mounting structure 300.

According to various embodiments, some or all of the external ribs 334 may extend around an entirety or a portion of the exterior surface 322 of the mounting structure 300. As illustrated in FIGS. 3B and 3C, external ribs 334 are shown to define an outermost diameter measured radially outward from axis 306 that is larger than a diameter of the mounting structure 300 at a location where an external rib 334 is not provided. In some embodiments, some or all of the external ribs 334 may each define different or similar diameters. In other embodiments, external ribs 334 may include any combination of diameters (e.g., two external ribs 334 of the same diameter and one external rib 334 of a different diameter). In other embodiments (not shown), such as, e.g., where the exterior surface 322 of the mounting structure 300 defines a tapered structure, some of the external ribs 334 may define an outermost diameter measured radially outward from the axis 306 that is smaller than an outermost diameter of the exterior surface 322 of mounting structure 300 about which no rib 334 is formed.

As illustrated in FIG. 3A, according to various embodiments, external ribs 334 may be defined by rounded structures that extend annularly about the entirety or a portion of the exterior surface 322 defining mounting structure 300. According to other embodiments, some or all of the external ribs 334 may be defined having any other shape, size, configurations, or arrangements. According to some embodiments, external ribs 334 may be formed monolithically with the exterior surface 322 of the mounting structure 300, so as to form a unitary, monolithic mounting structure. In other embodiments, external ribs 334 may be formed integrally with mounting structure 300 from a similar or different material, as that used to form the exterior surface 322 of mounting structure 300. In yet other embodiments, external ribs 334 may be formed of an external component (e.g., O-ring, etc.) configured to be installed about the exterior surface 322 of mounting structure 300 and configured to engage the internal grooves 316.

Referring to FIGS. 4A and 4B, a method of providing an anti-slip system 100 configured to minimize, limit, or prevent movement of grommet 102 relative to wire harness 114 and mounting structure 300 (or any other type of assembly or element about which grommet 102 may be attached) is shown according to an exemplary embodiment. The examples described herein are not intended to be limiting. The method described herein may be used with other devices, components, elements, or bodies not explicitly described herein.

Assembly of the anti-slip system 100 begins with providing a wire harness 114 having a mounting structure 300 provided thereon. As described with reference to FIGS. 3B and 3C above, according to some embodiments, the step of providing a wire harness 114 having a mounting structure 300 may be accomplished according to any number of desired arrangements, including, but not limited to: adhering or otherwise fitting a separately provided mounting structure 300 about an exterior of a wire harness and optionally impregnating all (or substantially all) of the voids between adjacent wires of the wire harness and/or gaps between the exterior of the wire harness and an interior surface of the mounting structure 300 with a bonding or other filler material; molding a mounting structure 300 to extend about an exterior of the wire harness and optionally through all (or substantially all) voids defined between adjacent wires of the wire harness 114; etc. In embodiments in which the mounting structure 300 is not provided as a discrete structure that is separate from the wire harness, and is instead defined by a structure that is formed directly (e.g. via molding) about a wire harness, assembly of the anti-slip system 100 may optionally also include obtaining (or being provided) an injectable material and a mold that is shaped, sized, or otherwise configured as needed to allow the mounting structure 300 to be formed about the wire harness.

Assembly of the anti-slip system 100 continues with the installation of mounting structure 300 and wire harness 114 through the hollow channel 116 of grommet 102. According to some embodiments, during installation, the hollow channel 116 of the mounting structure 300 may be expanded to allow the grommet 102 to be positioned about the wire harness 114 and attached mounting structure 300, with the grommet 102 being moved relative to the mounting structure 300 until the internal grooves 316 of the grommet 102 generally overlay the ribs 334 of the mounting structure 300. Once such positioned, the hollow channel 116 of the grommet 102 may be allowed to return to its resting configuration, such that the ribs 334 are positioned within and in contact with the internal grooves 316 of the grommet 102. In some embodiments, the diameter of the exterior surface 322 along the entirety or a portion of the length of the mounting structure 300 may be equal to or greater than the diameter of the portion of the interior surface 312 of the grommet 102 that is configured to overlay the mounting structure 300 exterior surface 322 when the grommet 102 is engaged about the mounting structure 300, such that the grommet 102 is attached to the mounting structure 300 via a compression fit along at least a portion the attachment between the grommet 102 interior surface 312 and the mounting structure 300 exterior surface 322.

According to various embodiments, the grommet 102 may be provided with any number of, or any combination of characteristics or features configured to assist in installing the wire harness 114 through the hollow channel 116 of the grommet 102. For example, according to various embodiments, the grommet 102 may be formed of an elastic material that allows the grommet 102 to resiliently expand to accept a wire harness 114, and which may subsequently substantially contract back to its initial size once the wire harness 114 has been installed. According to some embodiments, the grommet 102 may optionally also, or alternatively, include a slit (not shown) extending through the grommet 102 body portion 400 from the exterior surface 402 to the interior surface 312, and between a portion of the grommet 102 between the first end 303 and the second end 403 to facilitate installation of the grommet 102 about a wire harness 114.

Referring to FIGS. 4A-4B, upon installation of the mounting structure 300 through the hollow channel 116, the one or more external ribs 334 provided on mounting structure 300 align with the one or more internal grooves 316 at a same or similar location relative to axis 306. The one or more external ribs 334 are configured to engage the one or more internal grooves 316 such that movement of grommet 102 relative to mounting structure 300 along axis 306 is minimized, limited, or prevented. Additionally, according to some embodiments, the outermost external rib 334 is located outside of the hollow channel 116 such that the external rib 334 axially engages with external bumper 317 located on grommet 102. The external ribs 334 are configured to align along the axis 306 with the one or more internal grooves 316 and the one or more external bumpers 317 such that the external ribs 334 engage with the one or more internal grooves 316 and/or the one or more external bumpers 317 and minimize, limit, or prevent movement of the grommet 102 relative to mounting structure 300.

In such embodiments (not shown) where one or more axially-extending external ribs are provided along mounting structure 300 and one or more axially-extending internal grooves are provided along the hollow channel 116, the axially-extending external ribs are configured to align with the one or more axially-extending internal grooves. The one or more axially-extending external ribs are configured to radially engage (e.g., radially-outward from axis 306) with the one or more axially-extending internal grooves such that rotational movement of the grommet 102 relative to the mounting structure 300 is limited, minimized, or prevented. Additionally, upon installation of the mounting structure 300 through the hollow channel 116, additional external components (e.g., adhesive tape, O-rings, elastic bands, etc.) may be used to further secure the location of the grommet 102 relative to the mounting structure 300 and form a sealed cavity within hollow channel 116 between the interior surface 312 of the hollow channel 116 and the exterior surface 322 of the mounting structure 300 providing additional resistance to the transmission of contaminants through hollow channel 116.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A grommet system comprising:
   at least one wire;
   a grommet comprising:
   a body portion including an exterior surface and defining a first aperture;
   a support structure having an enlarged outer circumference having a groove configured to be attached to an exterior structure, the support structure defining a second aperture;
      wherein the diameter of the support structure is larger than a diameter of the body portion;
      a hollow channel extending between the first aperture and the second aperture, the channel being defined by an interior surface of the body portion and an interior surface of the support structure;
      a first groove defined by an interior surface of the hollow channel at a first location located on the body portion; the first groove defining an outer circumference larger than an outer circumference of an adjacent exterior surface of the body portion; and
      a second groove defined by the interior surface of the hollow channel at a second location located on an inner circumference of the support structure;
      wherein, the first groove and the second groove each extend radially outward past the adjacent exterior surface of the body portion and are configured to matingly fit with a first and second external rib outwardly projecting from an exterior surface of a mounting structure provided about at least one wire inserted into the hollow channel.

2. The grommet of claim 1, further comprising the groove in the outer circumference of the support structure extending outwardly and annularly about an exterior surface of the support structure.

3. The grommet of claim 2, wherein a location along the support structure at which the groove in the outer circumference of the support structure extends corresponds to the second location along the support structure at which the second groove is defined.

4. The grommet of claim 1, further comprising an outwardly and annularly extending external bumper provided about the exterior surface of the body portion.

5. The grommet of claim 4, wherein a thickness of the body portion as defined between the exterior surface of the body portion and the interior surface of the body portion is substantially uniform along a portion of the body portion defined between a rear end of the external bumper and a front end of the first groove provided about an exterior surface of the body portion.

6. The grommet of claim 5 wherein a diameter of the hollow channel is tapered between the first aperture and the second aperture.

7. A grommet assembly kit, comprising:
   a mounting structure configured to extend about an exterior surface of at least one wire, the mounting structure comprising a first and second engagement rib provided about an exterior surface of the mounting structure; and
   a grommet comprising:
   a body portion defining a first aperture;
   a support structure having an enlarged outer circumference having a groove configured to be attached to an exterior structure, the support structure defining a second aperture;
   wherein the diameter of the support structure is larger than a diameter of the body portion;
   a hollow channel extending between the first aperture and the second aperture, the channel being defined by an interior surface of the body portion and an interior surface of the support structure; and
   a first groove provided along an interior surface of the hollow channel at a first location located on the body portion; the first groove defining an outer circumference larger than an outer circumference of an adjacent exterior surface of the body portion; and
   a second groove defined by the interior surface of the hollow channel at a second location on an inner circumference of the support structure;
   wherein the first and second grooves of the grommet is configured to matingly fit with the first and second engagement rib of the mounting structure when the at least one wire about which the mounting structure extends is inserted into the hollow channel to prevent movement of the grommet in an axial direction relative to the at least one wire.

8. The kit of claim 7, wherein a diameter of the groove in the outer circumference of the support structure is smaller than a diameter of the first and second engagement ribs of the mounting structure.

9. The kit of claim 7, wherein the mounting structure further comprises a third engagement rib provided about the exterior surface of the mounting structure, wherein a front surface of an external bumper provided about an exterior surface of the body portion is configured to engage a rear surface of the third engagement rib of the mounting structure when the at least one wire about which the mounting structure extends is inserted into the hollow channel.

10. The kit of claim 7, wherein the mounting structure comprises a body portion defining a hollow passageway through which the at least one wire is configured to be inserted.

11. The kit of claim 7, wherein the mounting structure is defined by a material that has been molded about an exterior of the at least one wire.

12. The kit of claim 11, wherein at least a portion of the material from which the mounting structure is molded extends into at least a portion of one or more interstices defined between adjacent filaments that define the at least one wire about which the mounting structure is molded.

13. The kit of claim 7, wherein the mounting structure is formed about the at least one wire to provide a substantially fluid-tight seal.

14. The kit of claim 7, further comprising at least one of an adhesive tape, an O-ring, an elastic band configured to secure a location of the grommet relative to the mounting structure and form a sealed cavity without the hollow channel between the interior surface of the hollow channel and the exterior surface of the mounting structure.

* * * * *